March 5, 1935.  A. R. LONG  1,993,675
COMBINED CAR BUMPER AND LIGHT GUARD
Filed Jan. 24, 1929  2 Sheets-Sheet 1
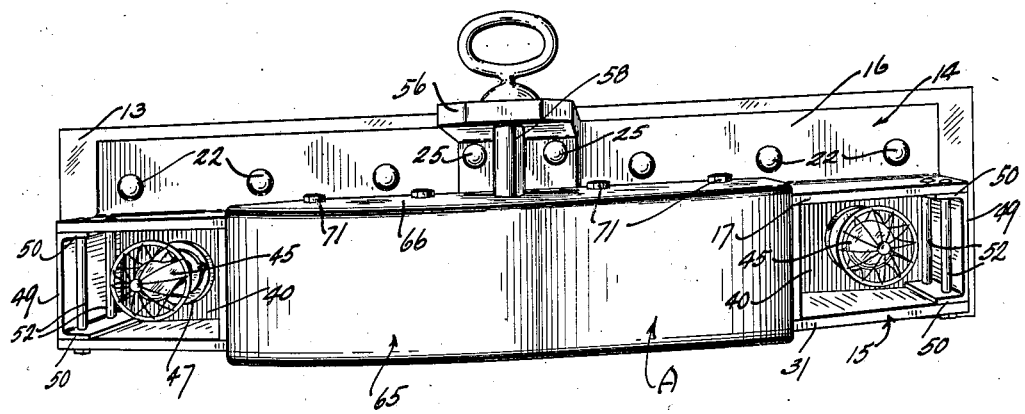
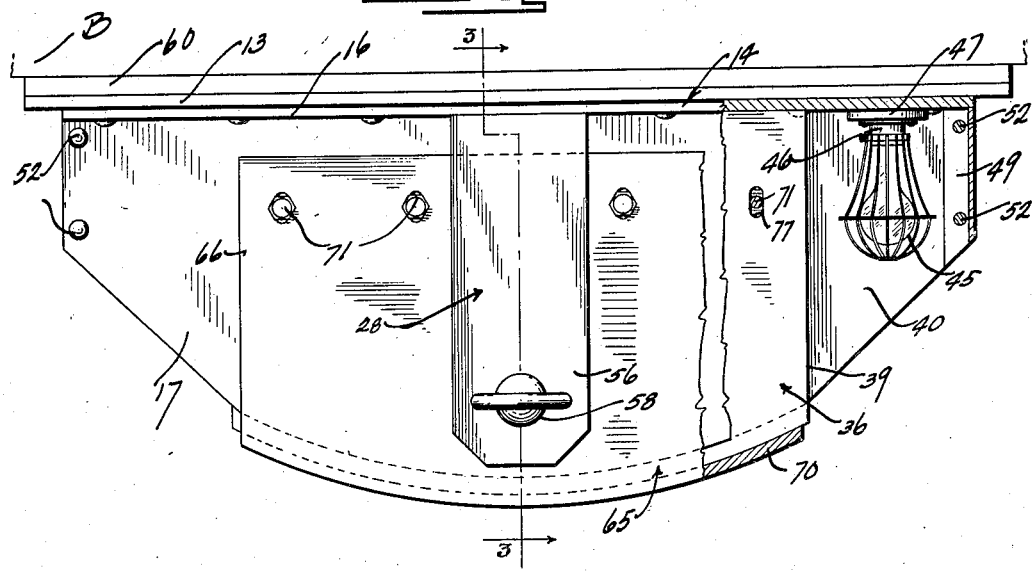
Armistead R. Long.
INVENTOR.
ATTORNEYS.

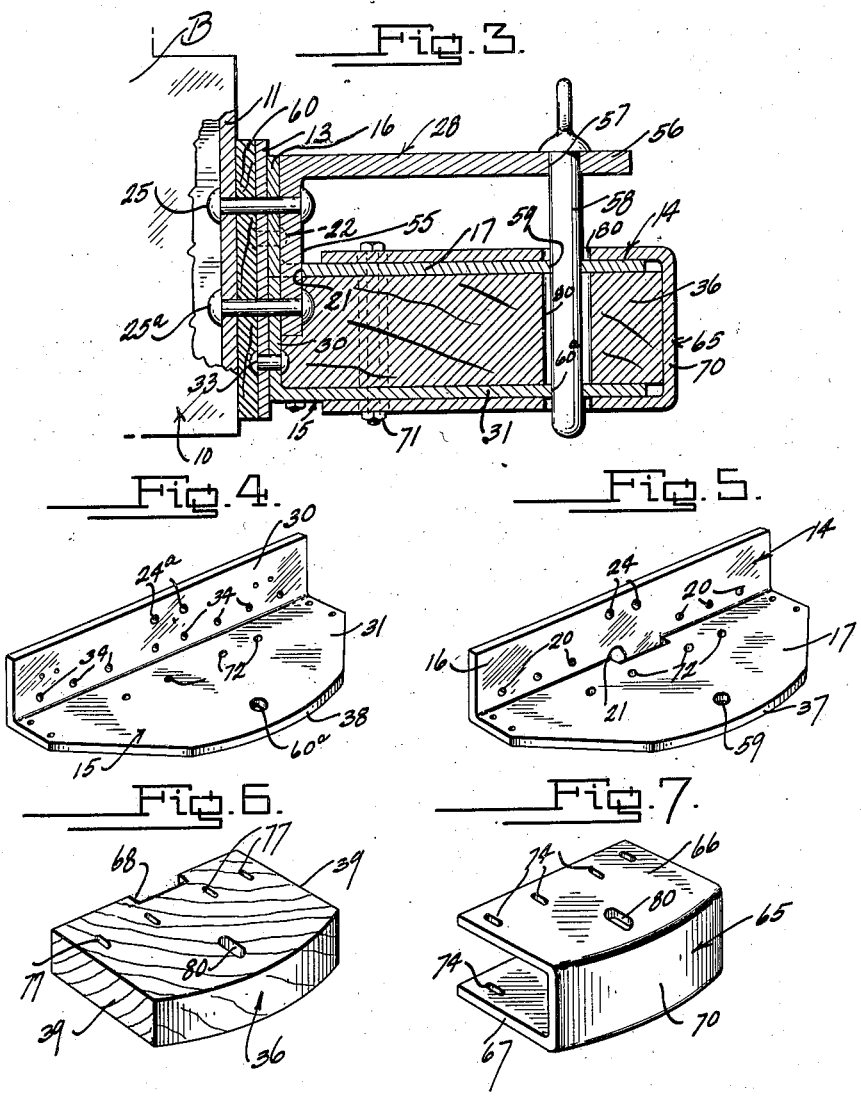

Patented Mar. 5, 1935

1,993,675

UNITED STATES PATENT OFFICE 1,993,675

COMBINED CAR BUMPER AND LIGHT GUARD

Armistead R. Long, Scarbro, W. Va.

Application January 24, 1929, Serial No. 334,791.

7 Claims. (Cl. 213—220)

This invention relates to improvements in bumpers for mine cars, locomotives and the like.

The primary object of this invention is the provision of an improved bumper including some of the features set forth in my pending application, Serial No. 319,890, filed November 16, 1928, Patent No. 1,922,310, August 15, 1933, and embodying improved means thereover by which the improved bumper construction is made adaptable for use upon locomotives and motor vehicles for propelling mine cars; having a construction which permits of the guarded carrying of headlights or tail lights thereon.

A further object of this invention is the provision of an improved bumper construction for mine cars and the like, by means of which safety in coupling is increased because of the large clearances which permit the operator to use his hands in coupling the cars without liability of being caught.

A further object of this invention is the provision of an improved bumper construction for mine cars, by means of which the shock of bumping is materially lessened because of improved shock absorbing or buffing means.

Other objects and advantages of this invention will be apparent during the course of the following detailed description.

In the accompanying drawings, forming a part of this specification, and wherein similar reference characters designate corresponding parts throughout the several views, Figure 1 is a perspective view of the improved bumper construction.

Figure 2 is a fragmentary plan view of the bumper construction attached to an end sill of a locomotive, or other type of mine car.

Figure 3 is a sectional view taken substantially on the line 3—3 of Figure 2.

Figures 4, 5, 6 and 7 are perspective views of details of the improved bumper.

In the drawings, wherein for the purpose of illustration is shown only a preferred embodiment of the invention, the letter A may generally designate the improved bumper construction, adapted for attachment to a car B, which may be a locomotive, mine car or vehicle.

The car B includes a frame 10, of which the metal end sill or wall 11 is a rigid part, and to which the improved bumper A is connected.

The bumper A preferably comprises a metal attaching plate 13, upon the front surface of which upper and lower angles 14 and 15 are riveted. The upper angle 14, shown more particularly in Figure 5, and as attached in Figure 3, includes the upstanding flange or wall 16, and the right angled horizontal bumper supporting plate or flange 17, integrally secured along the lower margin of the wall 16. The wall 16 is preferably provided with a series of openings 20 along each side of a draw bar receiving opening 21, which is provided through the plate portion 17 at its juncture with the flange 16; said openings 20 adapted to receive rivets 22, shown in dotted lines in Figure 3 by means of which to attach the angle 14 upon the upper portion of the supporting plate 13. Other openings 24 are provided in the attaching flange 16 of the angle 14, at the medial portion of said flange 16, for receiving rivets 25, shown in Figure 3, for attachment of the bumper construction to the end sill 11 and also for attachment of an angle-shaped draw bar 28 to be subsequently mentioned.

The lower angle 15 includes the attaching flange or wall 30, and the horizontal bumper supporting plate or flange 31, connected integral and normal to the flange 30 at the lower margin thereof. The flange 30 is, preferably, placed against the front of the supporting plate 13, and connected by rivets 33 thereto, through openings 34, shown in Figure 4. The flanges 16 and 30 of the angles 14 and 15 respectively are in the same plane, and this places the bumper supporting plates or flanges 17 and 31 in spaced horizontal relation for receiving therebetween a wood filler bumper block or piece 36, possessing some of the characteristics of the bumper block shown in my co-pending application above referred to.

The supporting angles 14 and 15 extend substantially the length of the end sill of the car, and the horizontal plates 17 and 31 thereof taper convergently at the side edges from points spaced from the vertical attaching flanges of the angle pieces, towards the free ends of the flanges 17 and 31, where said flanges are provided with convex free edges 37 and 38 respectively, shown in Figures 4 and 5. The flange 30 is also provided with openings 24ª adapted to receive rivets 25ª similar to the rivets 25 above mentioned, for the purpose of securing the bumper to the end sill of the car.

The bumper block 36 is of the nature shown in Figure 6, filling the space between the flanges 17 and 31, and in width being less than the space between said flanges, that is, having the side edges 39 thereof terminating short of the ends of the bumper supporting flanges 17 and 31; providing lamp receiving recesses 40 between the upper and lower plates 17 and 31 at opposite sides of the bumper block 36, as is shown in Figures 1 and 2. These recesses or compartments 40 open forwardly, and are intended to receive lamps 45, which are detachably carried in suitable waterproof sockets 46 mounted upon flexible rubber or other resilient supports 47, and connected in any approved manner to the vertical flange portion 30 of the lower angle piece 15. These compartments 40 are laterally enclosed by means of channel shaped end walls 49, which are shown in Figures 1 and 2 as including upper and lower inwardly extending flanges 50 adapted to abut the facing surfaces of the spaced plate portions 17 and 31 of the upper and lower angles; the same being suitably apertured for receiving detachable bolts 52 to hold the channel-shaped end walls 49 in place, as shown in Figure 1. These end walls not only laterally guard and enclose the lamps in the compartment 40, but brace the horizontal flanges 17 and 31 against bending.

The angle shaped draw bar 28 is relatively narrow in accordance with the form set forth in my co-pending application above referred to, including a depending vertical attaching leg 55, adapted to forwardly overlap the attaching flanges 16 and 30 of the upper and lower angle pieces 14 and 15 respectively; being inserted through the opening 21 in the angle 14, and being secured to the attaching plate 13 and the wood filler piece 11 by the bolts 25 and 25ª. The bumper construction is provided with a wood filler piece 60 clamped between the metal plate 13 and end sill or wall 11, and held in place by the rivets 25 and 25ª extending therethrough. If desired, some of the rivets 22 and 33 may extend in a riveted relation thru the filler piece 60 and the end sill 11 to additionally secure and rivet the bumper construction on the end wall or sill of the car. The draw bar body or extension 56 of the angle bar 28 extends forwardly in spaced relation above the angle plate 17, and at its free end it is provided with an opening 57 to receive the draw bar pin 58 therethrough. The flanges 17 and 31 are provided with similar openings 59 and 60ª respectively, to receive the coupling pin.

A channel-shaped bumper guard 65, of metal, is provided, having upper and lower horizontal flanges 66 and 67 respectively, and a concavo-convex front bumper wall 70. The flanges 66 and 67 are slipped above and beneath the plate or flange portions 17 and 31, with the bumper block 36 disposed between said plates 17 and 31. When in such position the bumper block at its rear end rests against the flange 30 of the lower angle piece 15, and it is rearwardly recessed at 68 to receive the lower portion of the angle draw bar flange 55, as shown in Figures 3 and 6. The front end of the wood filler bumper block 36 extends beyond the free edges 37 and 38 of the supporting angles, and the concavo-convex metal bumper wall 70 rests against the convex edge of the bumper block 36, as shown in Figure 3. Vertical bolts 71 are supported in openings 72 provided in the upper and lower plates 17 and 31 of the angle pieces 14 and 15 respectively, and which bolts 71 extend through the elongated slots 74 in the upper and lower flanges 66 and 67 of the channel-shaped bumper body 65 and through the elongated slots or openings 77 provided in the wood bumper block 36. It is obvious that these slots 74 and 77 permit the bumper parts 36 and 65 to have a limited movement with respect to the frame pieces of the bumper, to provide a more efficient bumping action.

The flanges 66 and 67, and the block 36 are provided with elongated slots or openings 80 to receive the coupling pin 58 therein to permit the above described movement of the bumper pieces 36 and 65.

From the foregoing it will be apparent that an improved type of car bumper has been provided, which is particularly well adapted for use as a bumper upon mine propelling cars, such as locomotives and motor cars; the bumper construction being relatively strong, such as will efficiently absorb shock and dissipate the forces evenly throughout the frame. The lights are situated in a protected relation which will permit of their efficient functioning notwithstanding shocks.

Various changes in the shape, size, and arrangement of parts may be made to the form of invention herein shown and described, without departing from the spirit of the invention or the scope of the claims.

I claim:

1. In a mine car bumper a car frame attaching plate, spaced plates connected with the plate and extending normal thereto, a bumper connected between the plates and projecting beyond the free edges thereof, the bumper at the sides terminating short of the ends of said plate to provide side compartments at opposite sides of the bumper between said plates adapted to receive lamps, said compartments opening in the same direction as the bumper faces, and means for resiliently mounting lamps in said compartments.

2. In a mine car the combination of a frame including an end sill, a metal plate, a wood filler plate, between the metal plate and end sill, means connecting the filler and metal plates in said relation upon the end sill, a bumper structure connected with said metal plate, and means providing lamp compartments at opposite sides of the bumper structure opening in the direction in which the bumper faces.

3. In a mine car bumper the combination of a supporting frame, a pair of spaced plates connected with said frame and extending transversely therefrom, a bumper connected in the space between the plates terminating short of the ends of the plates to provide compartments between the plates at each side of the bumper, detachable walls connected at similar ends of the plates for reinforcing the ends of the plates and laterally enclosing said compartments and lamps in said compartments.

4. In a mine car bumper the combination of a supporting frame, a pair of spaced plates connected with said frame and extending transversely therefrom, a bumper connected in the space between the plates terminating at its sides short of the ends of the plates to provide compartments between the plates at each side of the bumper, detachable walls connected at similar ends of the plate for reinforcing the ends of the plates and laterally enclosing said compartments, lamps in said compartments, and means resiliently mounting said lamps in said compartments.

5. In a bumper structure of the class described a supporting frame, an angle including an attaching flange connected with the frame and a transversely extending bumper supporting flange having an opening therein adjacent to the attaching flange, and a draw bar including an attaching leg connected to the frame against the attaching flange of the said angle, with the free end of the attaching leg extending snugly through the opening of the said angle, the draw bar including an upper narrow draw bar extension extending transverse to and connected with the upper end of said leg and spaced above the bumper supporting flange.

6. In a bumper structure of the class described a supporting frame, an angle including an attaching flange connected with the frame and a transversely extending bumper supporting flange having an opening therein adjacent to the attaching flange, an angled draw bar including an attaching leg connected to the frame against the attaching flange of the first mentioned angle, with the free end of the attaching leg extending through the opening of the first mentioned angle, the angled draw bar including an upper narrow draw bar extension spaced above the bumper supporting flange and a coupling pin connected with the free end of the draw bar extension and with the bumper supporting flange.

7. In a mine car bumper structure the combination of a vertical supporting plate, a pair of angles each including attaching flanges secured one above the other in the same vertical plane upon a face of the supporting plate, said angles at the lower margins of the respective attaching flanges having horizontally extending relatively spaced bumper supporting flanges, a bumper block between said bumper supporting flanges, the uppermost of the horizontal bumper supporting flanges having a transverse vertical opening therethrough immediately adjacent the plate attaching flange of its respective angle, an angled draw bar including an attaching leg fixedly connected with the attaching flanges of said angles and snugly extending intermediate its ends through the opening of said bumper supporting flange, said draw bar at the upper end of said leg having a horizontally extending draw bar portion spaced above the uppermost of the bumper supporting flanges, said daw bar portion, the bumper block and bumper supporting flanges all having aligning openings therein, and a coupling pin for detachable support in said aligning openings in extending relation across the space between the draw bar portion and the uppermost of said bumper supporting flanges.

ARMISTEAD R. LONG.